US010437170B2

(12) United States Patent
Taki

(10) Patent No.: US 10,437,170 B2
(45) Date of Patent: Oct. 8, 2019

(54) IMAGE FORMING APPARATUS

(71) Applicant: KYOCERA Document Solutions Inc., Osaka (JP)

(72) Inventor: Seiji Taki, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/321,225

(22) PCT Filed: Jun. 8, 2018

(86) PCT No.: PCT/JP2018/022017
§ 371 (c)(1),
(2) Date: Jan. 28, 2019

(87) PCT Pub. No.: WO2018/235632
PCT Pub. Date: Dec. 27, 2018

(65) Prior Publication Data
US 2019/0171127 A1 Jun. 6, 2019

(30) Foreign Application Priority Data
Jun. 20, 2017 (JP) .................................. 2017-120885

(51) Int. Cl.
*G03G 15/043* (2006.01)
*H04N 1/113* (2006.01)
(Continued)

(52) U.S. Cl.
CPC ........... *G03G 15/043* (2013.01); *G03G 15/00* (2013.01); *G03G 15/04072* (2013.01); *H04N 1/00087* (2013.01); *H04N 1/1135* (2013.01)

(58) Field of Classification Search
CPC .... G03G 15/04; G03G 15/043; G03G 15/556; G03G 15/5041; G03G 15/5058;
(Continued)

(56) References Cited

U.S. PATENT DOCUMENTS 6,418,281 B1 * 7/2002 Ohki .................. G03G 15/5062
358/300
2009/0067870 A1 3/2009 Hamanaka
(Continued)

FOREIGN PATENT DOCUMENTS

JP 10-171220 6/1998
JP 2010-134160 6/2010
(Continued)

OTHER PUBLICATIONS

International Search Report dated Aug. 21, 2018 in corresponding International Application No. PCT/JP2018/022017.

*Primary Examiner* — Thomas S Giampaolo, II
(74) *Attorney, Agent, or Firm* — Wenderoth, Lind & Ponack, L.L.P.

(57) ABSTRACT

Provided is an image forming apparatus configured to acquire a density of a test print image at each position in the main scanning direction, which is read by the image reading unit after a first test print image is formed, to correct a setting value of an exposure amount of an exposure device to a first light amount, which is higher than a reference light amount that is an exposure amount when the first test print image is formed, in an area where the acquired density is lower than a target density, to correct the exposure amount of the exposure device to a second light amount, which is lower than the reference light amount, in an area where the acquired density is higher than the target density, and to form a second test print image. On the basis of the second test print image, density correction is performed.

3 Claims, 13 Drawing Sheets

(51) Int. Cl.
    *H04N 1/00*     (2006.01)
    *G03G 15/04*     (2006.01)
    *G03G 15/00*     (2006.01)

(58) Field of Classification Search
    CPC .......... G03G 2215/00033; G03G 2215/00569; G03G 2215/00755
    See application file for complete search history.

(56) References Cited

U.S. PATENT DOCUMENTS

| | | | |
|---|---|---|---|
| 2011/0222868 A1 | 9/2011 | Sakatani | |
| 2011/0222869 A1* | 9/2011 | Sakatani | G03G 15/5062 399/15 |
| 2011/0228355 A1 | 9/2011 | Morita et al. | |
| 2012/0033276 A1* | 2/2012 | Zaima | H04N 1/6033 358/518 |

FOREIGN PATENT DOCUMENTS

| | | |
|---|---|---|
| JP | 2011-191416 | 9/2011 |
| JP | 2011-215582 | 10/2011 |
| JP | 2013-148778 | 8/2013 |
| JP | 2013-182099 | 9/2013 |

\* cited by examiner

IMAGE FORMING APPARATUS

TECHNICAL FIELD

The present invention relates to an image forming apparatus.

BACKGROUND ART

In general, in an electrophotographic image forming apparatus, an exposure device exposes a surface of a photoreceptor to form an electrostatic latent image, a developing device develops the formed electrostatic latent image to form a toner image, and the formed toner image is transferred to a recording medium, so that an image is formed.

In the photoreceptor on which the electrostatic latent image is formed, irregularity of charging characteristics or sensitivity characteristics exists in an axial direction of a drum surface due to factors on manufacturing. Furthermore, when the toner image is formed by developing the electrostatic latent image, there is a problem that density irregularity occurs in a main scanning direction (a drum shaft direction) due to an influence of variance of a gap with a developer carrier that supplies toner to the photoreceptor, variance of a light amount of an exposure device in the main scanning direction, and the like.

In order to solve such a problem, in an image forming apparatus disclosed in Patent Literature 1, test print images extending over the whole main scanning direction of a development area are printed, and an exposure amount is corrected at each position in the main scanning direction such that a density at each position of the printed test print image in the main scanning direction reaches a target density. In Patent Literature 1, by using two test print images having exposure amounts different from each other, densities of the two test print images are compared with each other at each position in the main scanning direction, so that the exposure amounts are corrected (see paragraph 0060 of Patent Literature 1).

Patent Literature 2 discloses an example of a correction method of an exposure amount. In this method, a plurality of test print images are formed on one sheet (recording medium) by changing exposure amounts in a stepped shape, and an image reading device reads densities of the formed test print images. Then, a change rate of an image density to a change in the exposure amount is calculated in a step section corresponding to a target density, and an exposure amount required for obtaining the target density is calculated by primary linear interpolation on the basis of the calculated change rate.

CITATION LIST

Patent Literature

Patent Literature 1: Japanese Unexamined Patent Application Publication No. 2010-134160
Patent Literature 2: Japanese Unexamined Patent Application Publication No. 10-171220

SUMMARY OF INVENTION

Technical Problem

However, in the method in which two test print images having exposure amounts different from each other are printed as disclosed in Patent Literature 1, interpolation accuracy may be reduced according to the size of an exposure amount in the second test printing to an exposure amount in the first test printing. That is, in general, a relation between an exposure amount and a density corresponds to a nonlinear relation as indicated by a solid line of FIG. 11. Therefore, when a point Q corresponding to the first test printing and a point R corresponding to the second test printing are away from an ideal point T corresponding to a target density, even though the exposure amounts are corrected by the primary linear interpolation on the basis of the point Q and the point R, a large error δ may occur between the target density and an actual density obtained by correcting the exposure amounts.

In this regard, Patent Literature 2 discloses the method in which the test print images, the exposure amounts of which have been changed in the stepped shape, are printed and the primary linear interpolation is performed on the basis of density data of a step section closest to the target density. However, in such a case, it is necessary to form a plurality of test print images by changing exposure amounts in a stepped shape. Therefore, there is a problem that time required for printing the test print images increases.

The present invention has been made to solve the aforementioned problems, and an object of the present invention is to shorten time required for printing a test print image and improve density correction precision at each position in a main scanning direction.

Solution to Problem

An image forming apparatus according to the present invention includes an image forming unit that has an exposure device for forming an electrostatic latent image by exposing a surface of a photoreceptor and a developing device for forming a toner image by developing the electrostatic latent image formed by the exposure device and forms an image by transferring the toner image developed by the developing device to a recording medium, an image forming control unit that controls the image forming unit to perform a process for forming a test print image on the recording medium twice, an image reading unit that is able to read a density of the test print image, and a density correction unit that performs density correction by correcting an exposure amount of the exposure device at each position in a main scanning direction on the basis of a result obtained by reading the test print image in the image reading unit.

The image forming control unit is configured to acquire a density of the test print image at each position in the main scanning direction, which is read by the image reading unit after a first test print image is formed by the image forming unit, to correct a setting value of an exposure amount of the exposure device to a first light amount, which is higher than a reference light amount that is an exposure amount when the first test print image is formed, in an area where the acquired density is lower than a target density, to correct the exposure amount of the exposure device to a second light amount, which is lower than the reference light amount, in an area where the acquired density is higher than the target density, and to form a second test print image, and the density correction unit is configured to calculate densities of the first test print image and the second test print image at each position in the main scanning direction, and to perform density correction using primary linear interpolation on the basis of a difference between the calculated densities and a difference between the exposure amount when the first test print image is formed and an exposure amount when the second test print image is formed.

Advantageous Effects of Invention

According to the present invention, it is possible to shorten time required for printing a test print image and improve density correction precision at each position in a main scanning direction.

DESCRIPTION OF EMBODIMENTS

Hereinafter, embodiments of the present invention will be described in detail on the basis of the drawings. It is noted that the present invention is not limited to the following embodiments.

<<Embodiment>>

Figure 1:
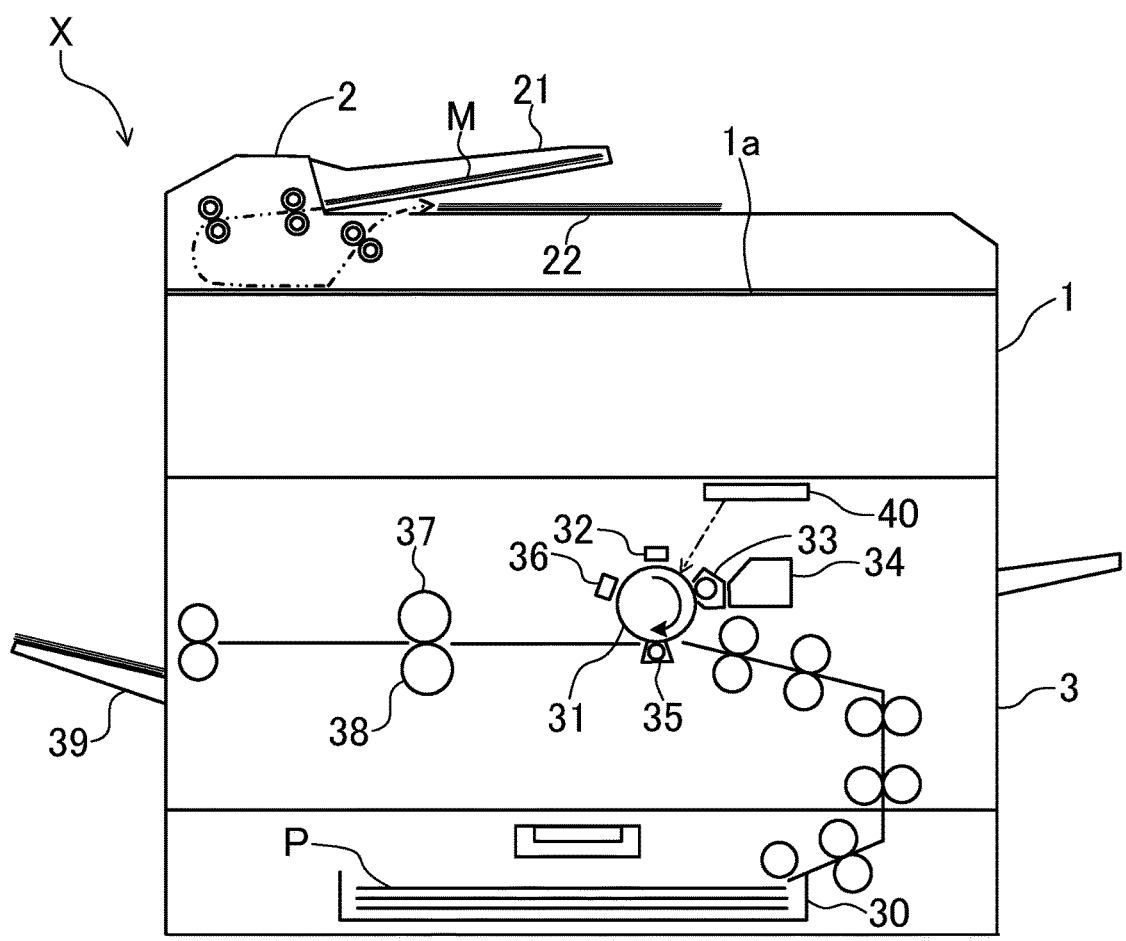
FIG. 1 is an overall view illustrating a schematic configuration of an image forming apparatus in an embodiment.

FIG. 1 illustrates an image forming apparatus X in an embodiment. The image forming apparatus X includes an image reading unit 1, an auto document feeder (ADF) 2, an image forming unit 3, a control unit 4, an operation display unit (not illustrated) and the like.

The image forming apparatus X forms an image on a sheet on the basis of image data read by the image reading unit 1 or image data inputted from an information processing device such as an external personal computer.

The image forming unit 3 includes a sheet feeding cassette 30, a photoreceptor 31, a charging device 32, a developing device 33, a toner container 34, a transfer roller 35, a static eliminating device 36, a fixing roller 37, a pressure roller 38, a sheet discharge tray 39, a laser scanning unit (hereinafter, referred to as LSU) 40 as an optical scanning device, and the like.

In the image forming unit 3, an image is formed on a sheet supplied from the sheet feeding cassette 30 according to the following procedure. Specifically, firstly, the photoreceptor 31 is uniformly charged to a predetermined potential by the charging device 32. Next, light based on image data is irradiated to a surface of the photoreceptor 31 from the LSU 40. In this way, an electrostatic latent image is formed on the surface of the photoreceptor 31. Then, the electrostatic latent image on the photoreceptor 31 is developed by the developing device 33 as a toner image. It is noted that toner is replenished to the developing device 33 from the toner container 34.

The toner image formed on the photoreceptor 31 is transferred to a sheet P by the transfer roller 35. Thereafter, the toner image transferred to the sheet P is heated in the fixing roller 37 so as to be molten and fixed when the sheet P passes through between the fixing roller 37 and the pressure roller 38. It is noted that the potential of the photoreceptor 31 is eliminated by the static eliminating device 36.

The image reading unit 1 optically reads an image of a document set on a contact glass 1a provided on an upper surface of the image reading unit 1 or a document M supplied onto the contact glass 1a by the ADF 2. The ADF 2 supplies the document M set in a sheet feeding document tray 21 to a predetermined image reading position and then discharges the document M to a document discharge tray 22. The image reading unit 1 is provided therein with a CCD sensor (not illustrated) for reading an image of a document, an optical system for guiding reflected light to the CCD sensor from the document, and the like.

Figure 2:
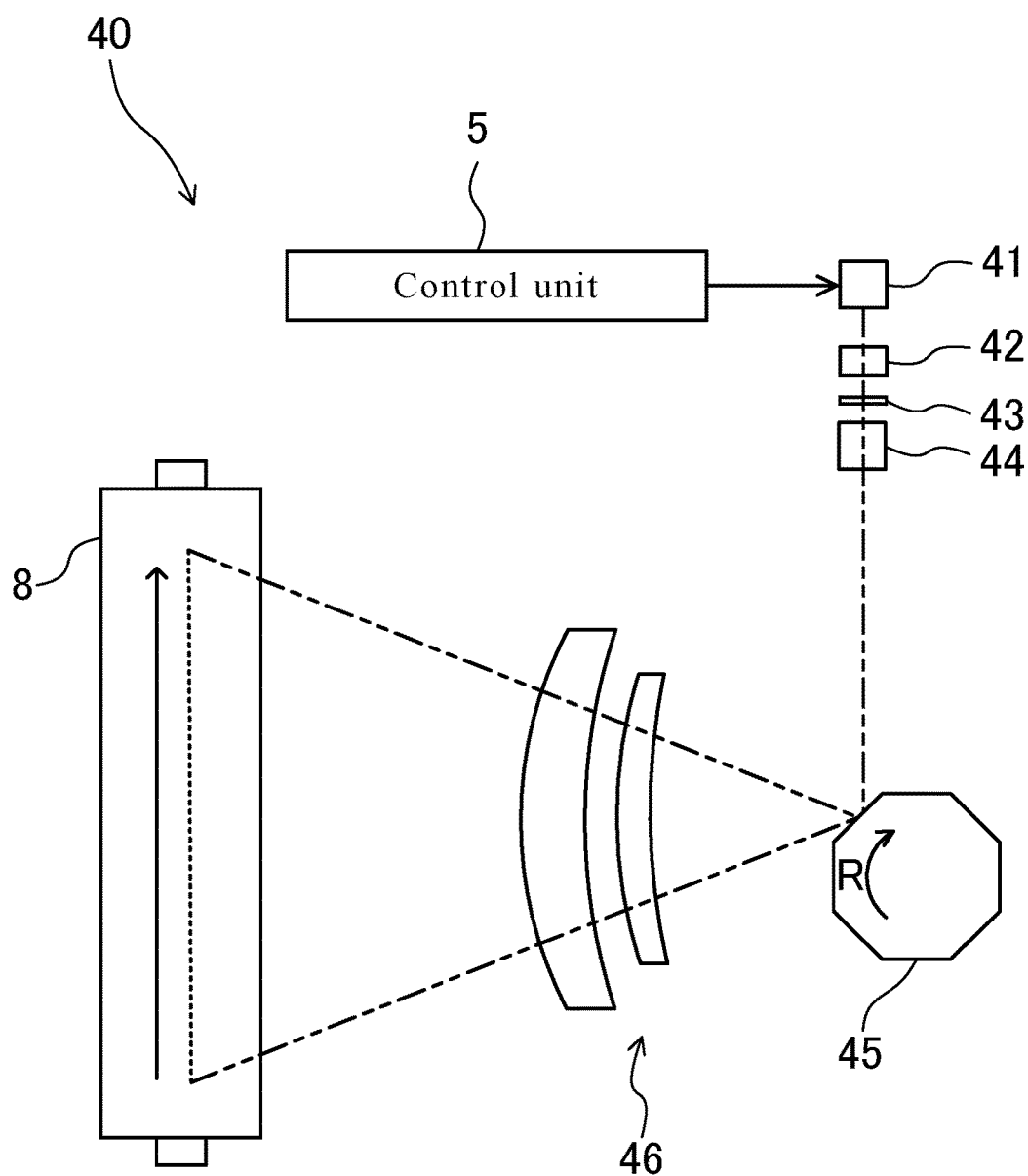
FIG. 2 is a plan view illustrating a schematic configuration of an optical scanning device.

Next, with reference to FIG. 2, a schematic configuration of the LSU 40 will be described. As illustrated in FIG. 2, the LSU 40 includes a laser light source 41, a coupling lens 42, an aperture 43, a cylindrical lens 44, a polygon mirror 45, an fθ lens 46 and the like.

The coupling lens 42 is a collimator lens that approximately collimates laser light L irradiated from the laser light source 41. The aperture 43 shapes the laser light L approximately collimated by the coupling lens 42. The cylindrical lens 44 converges the laser light L shaped by the aperture 43 in a sub-scanning direction, and forms an image of the laser light L on a reflecting surface of the polygon mirror 45 in a linear shape long in a main scanning direction.

The polygon mirror 45 is rotationally driven by a driving motor (not illustrated) in a direction indicated by an arrow R (see FIG. 2), thereby reflecting (deflecting) the laser light L emitted from the laser light source 41 in a prescribed direction and allowing the laser light L to be scanned in the main scanning direction with respect to the photoreceptor 31. The polygon mirror 45 is a rotating polygon mirror having six reflecting surfaces for reflecting the laser light L irradiated from the laser light source 41. It is noted that the polygon mirror 45 illustrated in FIG. 2 has a regular hexagonal shape, but may have other regular polygonal shapes.

The fθ lens 46 converts the equiangular velocity motion of the laser light L in the polygon mirror 45 to a uniform motion, and forms the image of the laser light L on the surface of the photoreceptor 31.

Meanwhile, in the photoreceptor 31 on which the electrostatic latent image is formed, irregularity of charging characteristics or sensitivity characteristics exists in an axial direction of a drum surface due to factors on manufacturing. Furthermore, when the toner image is formed by developing the electrostatic latent image, there is a problem that density irregularity occurs in a print image in the main scanning direction due to an influence of variance of a gap with a developer carrier that supplies toner to the photoreceptor 31, variance of a light amount of the laser light in the main scanning direction, and the like.

In contrast, in the image forming apparatus X of the present embodiment, the control unit 5 performs density correction control at each position in the main scanning direction, thereby suppressing the occurrence of density irregularity in the main scanning direction. Each position in the main scanning direction, for example, may be a position corresponding to each pixel of image data generated by the image reading unit 1, or a position of each block including a plurality of pixels.

The control unit 5 includes a microcomputer having a CPU, a ROM, a RAM and the like. On the basis of an operation signal from the operation display unit (not illustrated), the control unit 5 controls the image forming unit 3 and prints an image on the sheet P. The control unit serves as an image forming control unit and a density correction unit.

Figure 3:
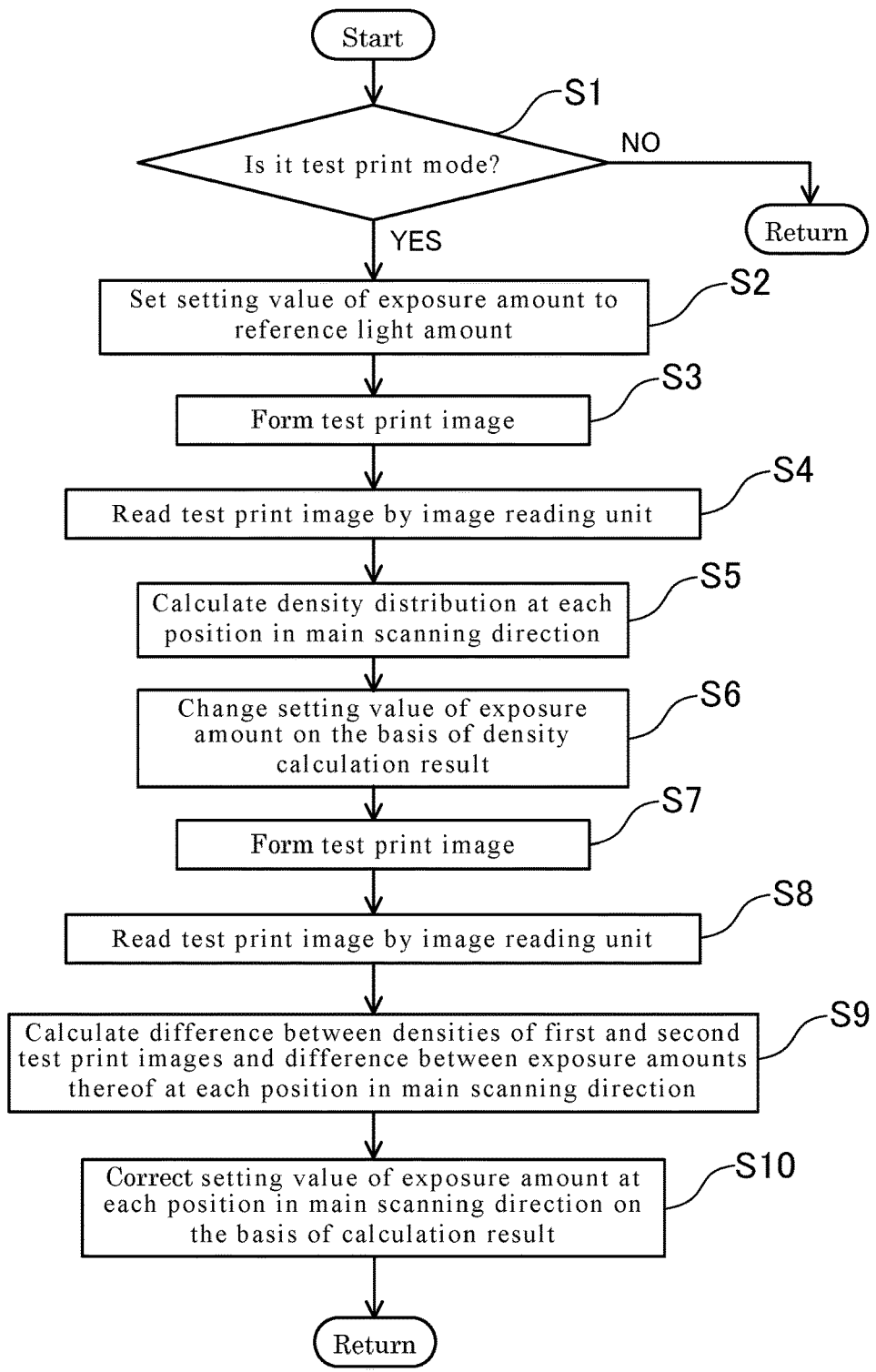
FIG. 3 is a flowchart illustrating details of density correction control performed by a control unit.

FIG. 3 is a flowchart illustrating details of density correction control performed by the control unit 5.

In step S1, the control unit 5 determines whether a test print mode has been set on the basis of an operation signal from the operation display unit. When this determination is NO, the control unit 5 returns, and when this determination is YES, the control unit 5 proceeds to step S2.

Figure 4:
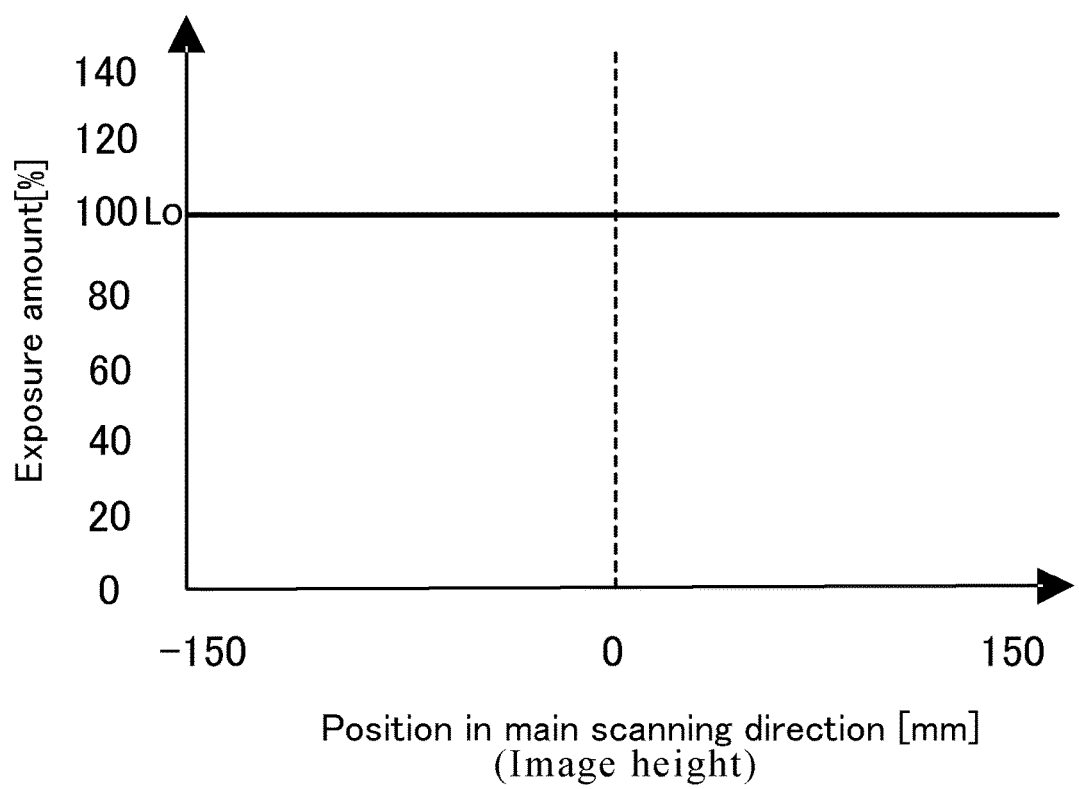
FIG. 4 is a graph illustrating a setting value of an exposure amount when a first test print image is formed.

In step S2, the control unit 5 sets a setting value of an exposure amount of the LSU 40 at each position in the main scanning direction of a development area of the photoreceptor 31 to a reference light amount Lo. FIG. 4 graphically illustrates the setting value of the exposure amount of the LSU 40 at each position in the main scanning direction of the development area of the photoreceptor 31. As illustrated in the drawing, the setting value of the exposure amount is constant (the reference light amount Lo) at each position in the main scanning direction.

Figure 5:
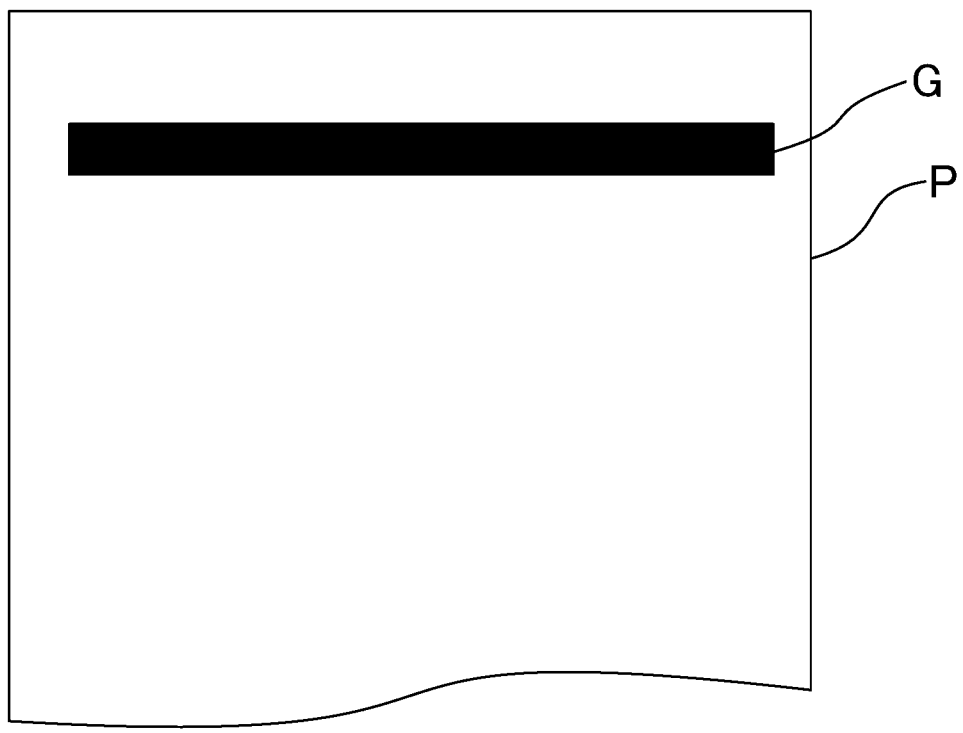
FIG. 5 is a diagram illustrating an example of a test image.

In step S3, the control unit 5 controls the image forming unit 3 including the LSU 40, thereby performing first test printing on the sheet P. FIG. 5 illustrates an example of a test print image G formed on the sheet P by the test printing. In this example, the test print image G is a linear solid image extending over the whole in the main scanning direction of an image forming area of the sheet P.

In step S4, the test print image G formed on the sheet P in step S3 is read by the image reading unit 1. When the test print image G is read by the image reading unit 1, it is sufficient if a user sets the sheet P on the ADF 2 or the contact glass 1a and manually performs a reading start operation. It is noted that for example, the test print image G may be automatically read by a line sensor and the like provided onto a conveyance path.

Figure 6:
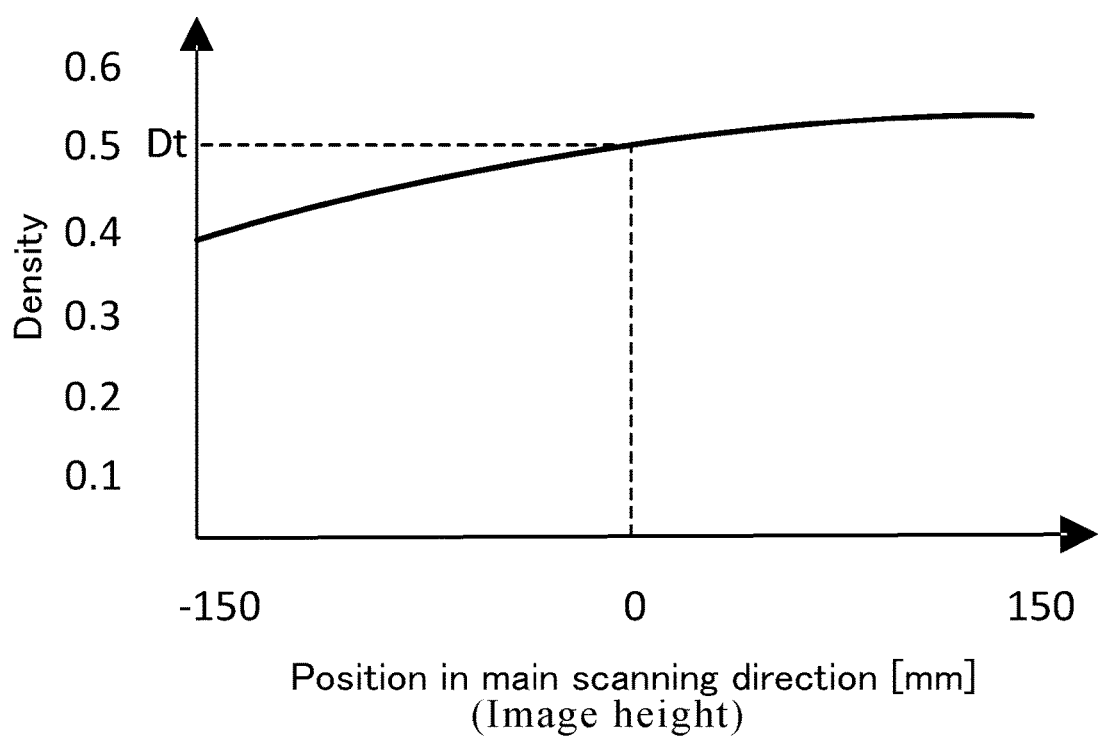
FIG. 6 is a graph illustrating an example of a density calculation result of a first test print image.

In step S5, the control unit 5 calculates a density at each position in the main scanning direction of the test print image G read in step S4. FIG. 6 is a graph illustrating an example of the density calculation result. In this example, a density is lower than a target density Dt (0.5 in this example) at a minus side from a center position in the main scanning direction of the image forming area, is higher than the target density Dt at a plus side from the center position (a position at which an image height is 0 mm) in the main scanning direction, and coincides with the target density Dt at the center position in the main scanning direction.

Figure 7:
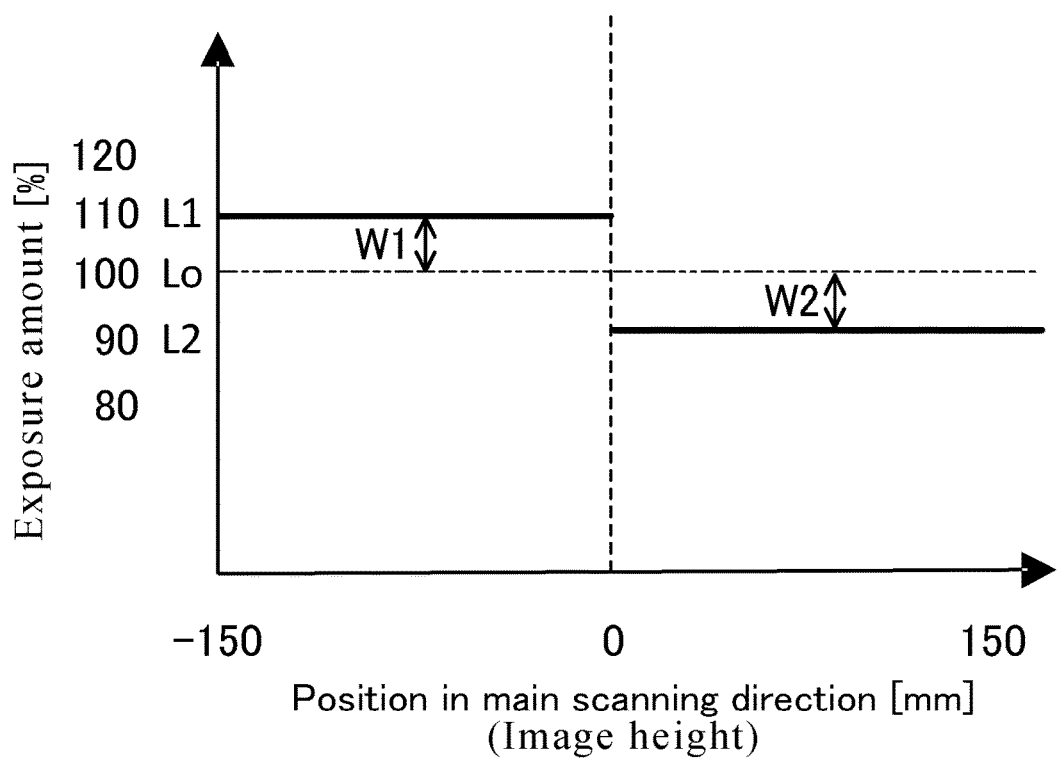
FIG. 7 is a graph illustrating a setting value of an exposure amount when a second test print image is formed.

In step S6, the control unit 5 corrects (changes) the setting value of the exposure amount of the LSU 40 according to the density at each position in the main scanning direction of the test print image G, which has been calculated in step S5. Specifically, the control unit 5 sets the setting value of the exposure amount to a first light amount L1 higher than the reference light amount Lo in an area where the density is lower than the target density Dt, sets the setting value of the exposure amount to a second light amount L2 lower than the reference light amount Lo in an area where the density is higher than the target density Dt, and sets the setting value of the exposure amount to the reference light amount Lo at a position (the center position in the main scanning direction) in which the density coincides with the target density Dt. FIG. 7 is a graph illustrating a change example of the exposure amount when the density calculation result of the first test print image G is the result as illustrated in FIG. 6. According to this graph, the exposure amount corresponds to the first light amount L1 higher than the reference light amount Lo at a minus side from the center position in the main scanning direction, corresponds to the reference light amount Lo at the center position in the main scanning direction, and corresponds to the second light amount L2 lower than the reference light amount Lo at a plus side from the center position in the main scanning direction. In this example, the first light amount L1 corresponds to 1.1 times (110%) of the reference light amount Lo and the second light amount L2 corresponds to 0.9 times (90%) of the reference light amount Lo.

In step S7, the control unit 5 performs second test printing with the exposure amount changed in step S6, thereby forming a test print image G on the sheet P.

In step S8, the second test print image G printed on the sheet P is read by the image reading unit 1. It is sufficient if the test print image G is manually or automatically read similarly to step S4.

In step S9, the control unit 5 calculates a density at each position in the main scanning direction of the test print image G (that is, the test print image G read in step S8) formed by the second test printing. Then, the control unit 5 calculates a difference between the densities of the first test print image G and the second test print image G and a difference between the exposure amounts thereof at each position in the main scanning direction.

In step S10, on the basis of the difference between the densities of the first test print image G and the second test print image G and the difference between the exposure amounts of the first test print image G and the second test print image G, which have been calculated at each position in the main scanning direction, the control unit 5 obtains a corrected exposure amount Ls for correcting the density at each position in the main scanning direction to the target density by primary linear interpolation, and then returns.

Figure 8:
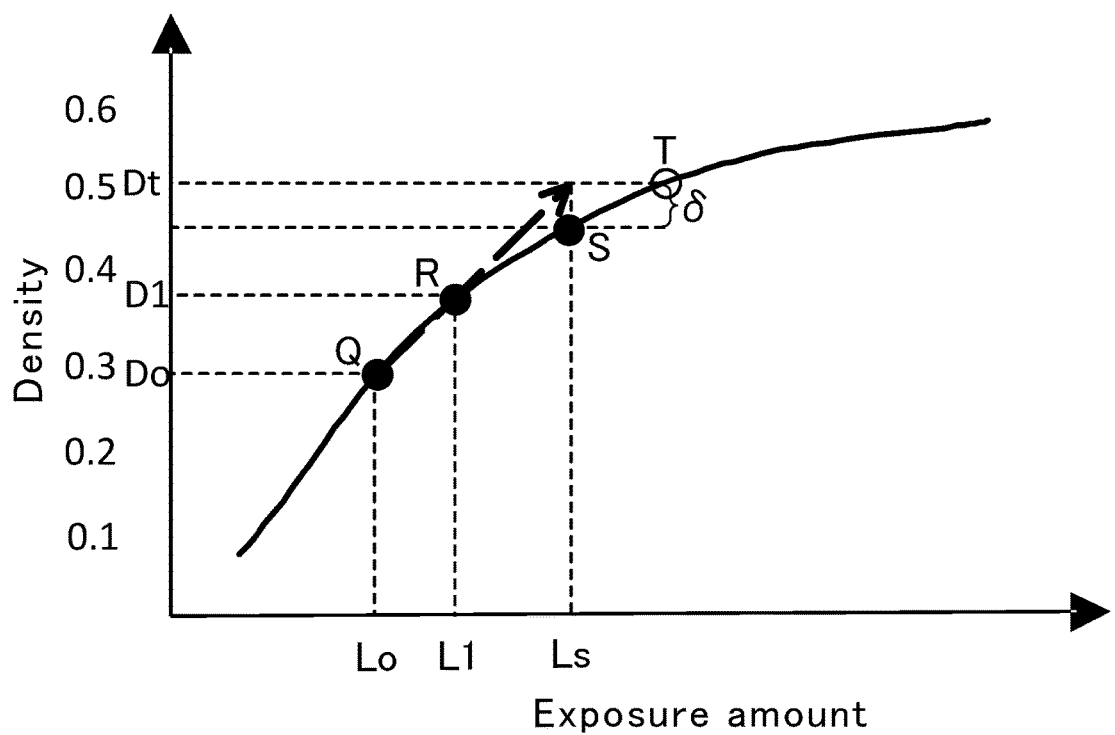
FIG. 8 is a graph for explaining a correction method of a setting value of an exposure amount.
Figure 9:
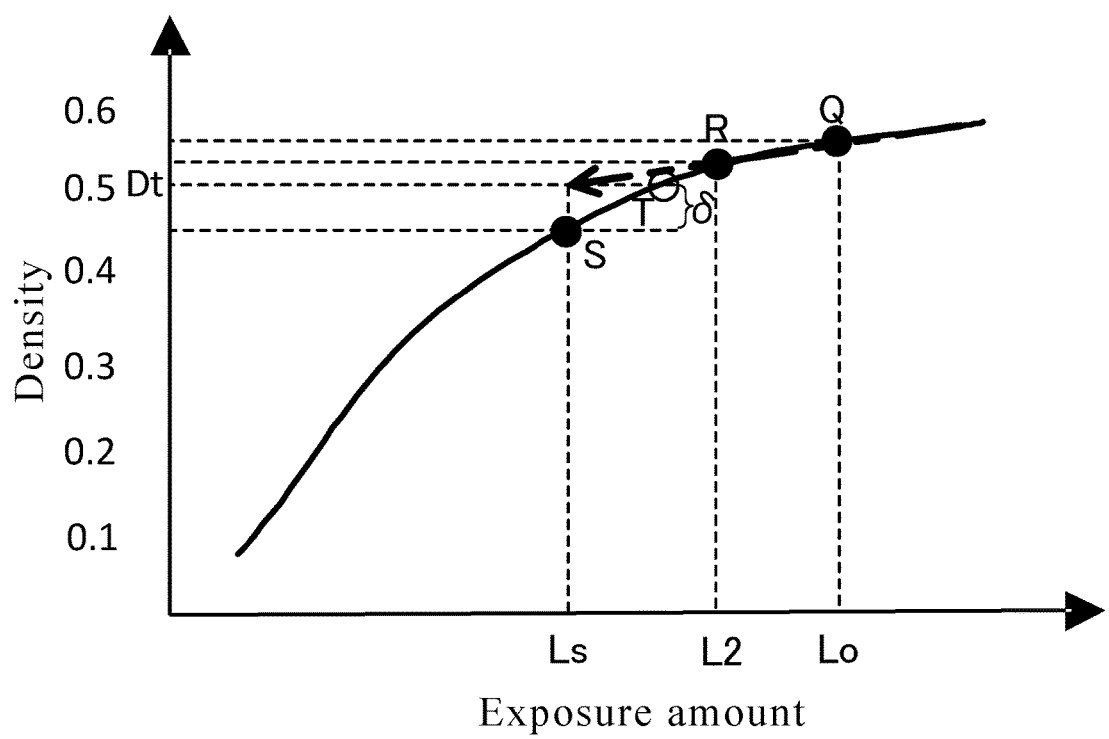
FIG. 9 is a graph for explaining a correction method of a setting value of an exposure amount.

FIG. 8 and FIG. 9 are graphs for explaining the correction method of the exposure amount in step S10. Firstly, with reference to FIG. 8, a description will be provided for the correction method of the exposure amount in an area (that is, the area where the density of the first test print image G is lower than the target density Dt) of the minus side from the center position in the main scanning direction. In the graph, a horizontal axis denotes the exposure amount and a vertical axis denotes the density. In the graph, a curved line is a measurement line obtained by actually measuring a relation between the exposure amount and the density. In the drawing, a point Q is a point corresponding to the first test print image G and its exposure amount and density are the reference light amount Lo and Do, respectively. A point R is a point corresponding to the second test print image G and its exposure amount and density are the first light amount L1 higher than the reference light amount Lo and D1, respectively. The corrected exposure amount Ls can be obtained by connecting the point Q and the point R to each other with a straight line and performing the primary linear interpolation (see an arrow indicated by a two dot chain line of the drawing). In the drawing, δ denotes an error between an actual density, which is obtained when the setting value of the exposure amount has changed to the corrected exposure amount Ls, and the target density Dt (0.5 in this example).

Next, with reference to FIG. 9, a description will be provided for the correction method of the exposure amount in an area (that is, the area where the density of the first test print image G is higher than the target density Dt) of the plus side from the center position in the main scanning direction. The basic correction method is identical to that of FIG. 8, but the correction method of FIG. 9 is different from that of FIG. 8 in that the exposure amount of the point R corresponding to the second test print image G is the second light amount L2 lower than the reference light amount Lo. In the drawing, δ denotes an error between an actual density, which is obtained when the setting value of the exposure amount has changed to the corrected exposure amount Ls, and the target density Dt.

Figure 10:
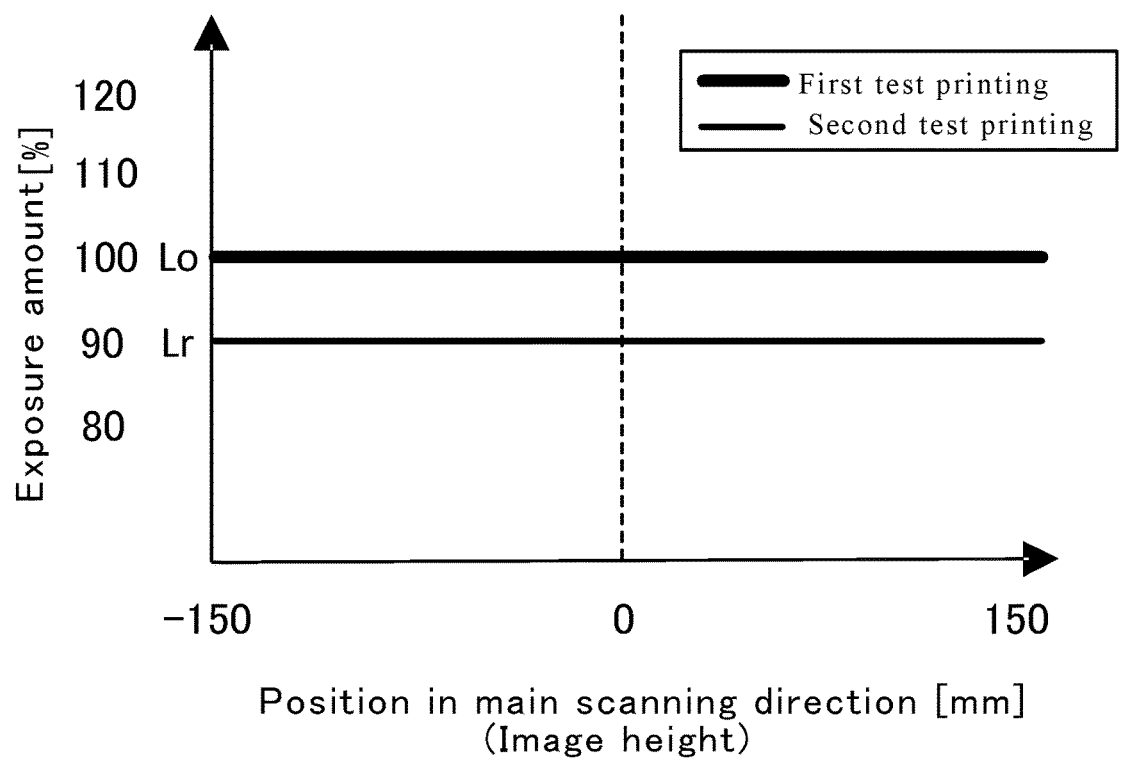
FIG. 10 is a graph illustrating a setting value of an exposure amount in the related art.
Figure 11:
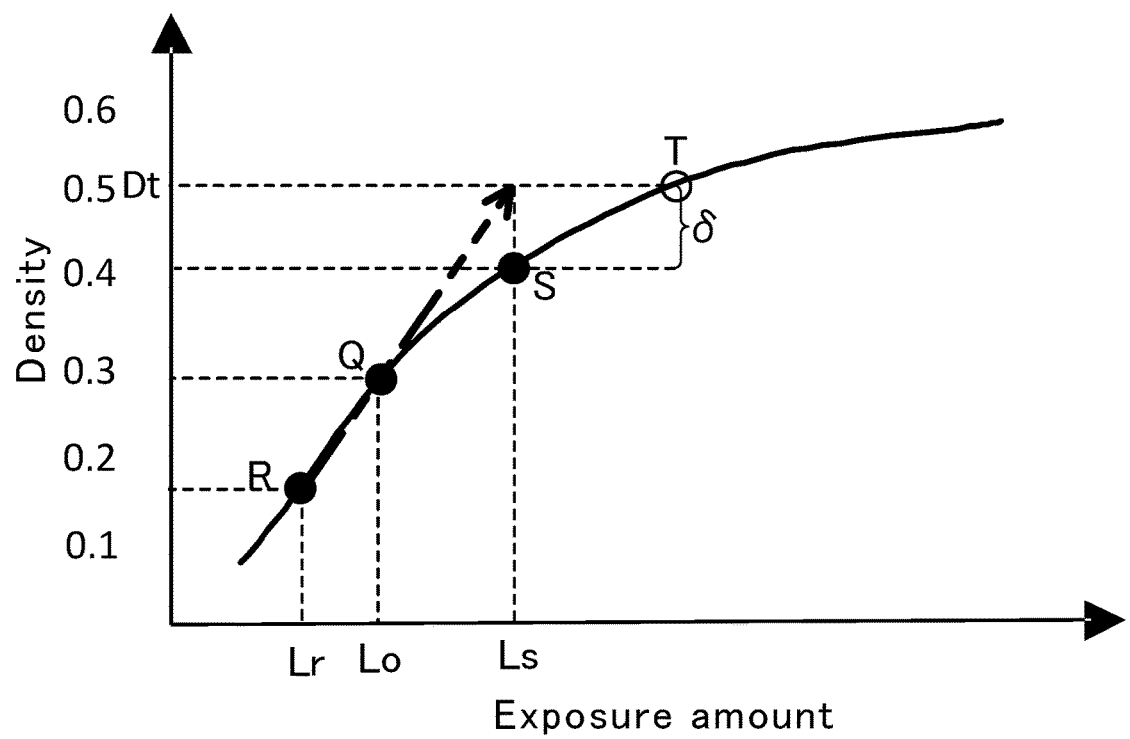
FIG. 11 is a graph corresponding to FIG. 8 in the related art.

As described above, in the present embodiment, an exposure amount when the second test print image G is printed is switched to the first light amount L1 and the second light amount L2 according to a density at each position in the main scanning direction of the first test print image G. Consequently, it is possible to reduce the density error δ as compared with the case where a setting value of an exposure amount when the second test print image G is formed is constantly maintained to a predetermined exposure amount Lr regardless of positions in the main scanning direction (that is, regardless of a density of each position in the main scanning direction of the first test print image) in the related art (see FIG. 10).

That is, in the related image forming apparatus X, for example, when the exposure amount Lr in the second test printing is set to a constant value lower than the reference light amount Lo regardless of positions in the main scanning direction, since a point R corresponding to the second test print image is away from an ideal point T corresponding to the target density Dt, the density error δ increases as compared with FIG. 8. In contrast, in the present embodiment, as illustrated in FIG. 8 and FIG. 9, the exposure amount in the second test printing is switched such that the point R corresponding to the second test print image G approaches the ideal point T, so that it is possible to reduce the density error δ as compared with the related art.

<<Embodiment 2>>

Figure 12:
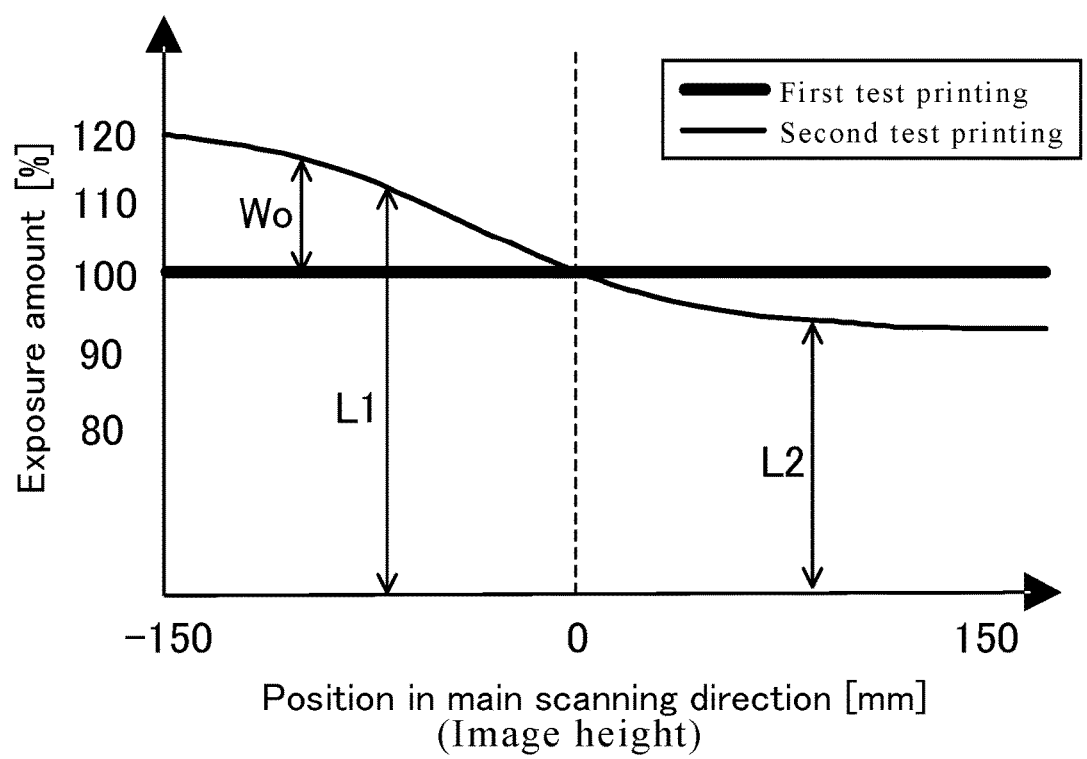
FIG. 12 is a graph illustrating a setting value of an exposure amount in an embodiment 2.

FIG. 12 illustrates an embodiment 2. This embodiment is different from the aforementioned embodiment 1 in terms of a correction method of an exposure amount in the second test printing. That is, in the present embodiment, the first light amount L1 and the second light amount L2 are not set to constant values as with the embodiment 1 and are changed according to the density at each position in the main scanning direction of the first test print image G, which is calculated in step S5.

In the present embodiment, with an increase in a difference between the density at each position in the main scanning direction of the first test print image G and the target density Dt, resulting in an increase in a difference Wo between the exposure amount in the second test printing and the reference light amount Lo that is the exposure amount in the first test printing. In other words, the first light amount L1 is set to increase as the density of the first test print image G decreases at each position in the main scanning direction, and the second light amount L2 is set to decrease as the density of the first test print image G increases at each position in the main scanning direction. According to such a configuration, it is possible to more reliably obtain operation and effect similar to those of the embodiment 1.

<<Other Embodiments>>

Figure 13:
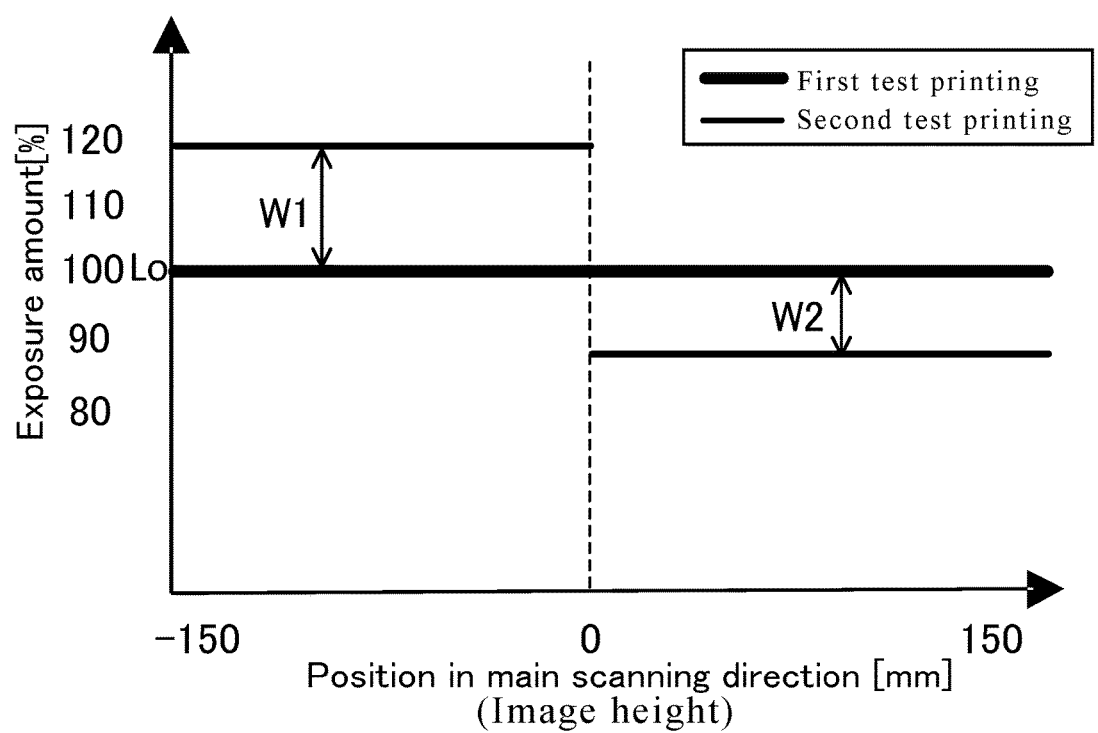
FIG. 13 is a graph illustrating a setting value of an exposure amount in another embodiment.

FIG. 7 of the aforementioned embodiment 1 illustrates an example in which a difference W1 between the first light amount L1 and the reference light amount Lo is identical to a difference W2 between the second light amount L2 and the reference light amount Lo; however, W1 and W2 may be different from each other as illustrated in FIG. 13.

The image forming apparatus X is assumed as a copy machine, but may be a facsimile, a printer, a multifunctional peripheral (MFP) and the like. Furthermore, in the aforementioned embodiment, a monochrome image forming apparatus X has been described as an example; however, the present invention can also be applied to a color image forming apparatus.

INDUSTRIAL APPLICABILITY

As described above, the present invention is available for an image forming apparatus.

The invention claimed is:

1. An image forming apparatus comprising:
   an image forming unit that has an exposure device for forming an electrostatic latent image by exposing a surface of a photoreceptor and a developing device for forming a toner image by developing the electrostatic latent image formed by the exposure device and forms an image by transferring the toner image developed by the developing device to a recording medium;
   an image forming control unit that controls the image forming unit to perform a process for forming a first test print image and a second test print image on the recording medium;
   an image reading unit that is able to read a density of the first test print image and the second test print image; and
   a density correction unit that performs density correction by correcting an exposure amount of the exposure device at each position in a main scanning direction on the basis of a result obtained by reading the first test print image and the second test print image in the image reading unit, wherein
   the image forming control unit is configured to acquire a density of the first test print image at each position in the main scanning direction, which is read by the image reading unit, to correct a setting value of an exposure amount of the exposure device to a first light amount, which is higher than a reference light amount that is an exposure amount when the first test print image is formed, in an area where the acquired density is lower than a target density, to correct the exposure amount of the exposure device to a second light amount, which is lower than the reference light amount, in an area where the acquired density is higher than the target density, and to form the second test print image, and
   the density correction unit is configured to calculate densities of the first test print image and the second test print image at each position in the main scanning direction, and to perform density correction using primary linear interpolation on the basis of a difference between the calculated densities and a difference between the exposure amount when the first test print image is formed and an exposure amount when the second test print image is formed.

2. The image forming apparatus of claim 1, wherein the first light amount and the second light amount are prescribed constant values.

3. The image forming apparatus of claim 1, wherein the first light amount is set to increase as the density of the first test print image decreases at each position in the main scanning direction, and the second light amount is set to decrease at each position in the main scanning direction as the density of the first test print image increases at each position in the main scanning direction.

* * * * *